United States Patent
Bodin et al.

(10) Patent No.: US 7,778,980 B2
(45) Date of Patent: Aug. 17, 2010

(54) PROVIDING DISPARATE CONTENT AS A PLAYLIST OF MEDIA FILES

(75) Inventors: William K. Bodin, Austin, TX (US); David Jaramillo, Lake Worth, FL (US); Jesse W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 11/420,018

(22) Filed: May 24, 2006

(65) Prior Publication Data

US 2007/0276866 A1 Nov. 29, 2007

(51) Int. Cl.
*G06F 17/30* (2006.01)
(52) U.S. Cl. .................. 707/693; 707/621; 707/641; 709/226
(58) Field of Classification Search .................. 707/101, 707/102, 693, 621, 641; 709/246; 715/203
See application file for complete search history.

(56) References Cited

U.S. PATENT DOCUMENTS

| | | | |
|---|---|---|---|
| 5,819,220 | A | 10/1998 | Sarukkai et al. |
| 6,032,260 | A | 2/2000 | Sasmazel et al. |
| 6,178,511 | B1 | 1/2001 | Cohen et al. |
| 6,240,391 | B1 | 5/2001 | Ball et al. |
| 6,266,649 | B1 | 7/2001 | Linden et al. |
| 6,311,194 | B1 | 10/2001 | Sheth et al. |
| 6,771,743 | B1 | 8/2004 | Butler et al. |
| 6,944,591 | B1 | 9/2005 | Raghunandan |
| 6,976,082 | B1 | 12/2005 | Ostermann et al. |
| 6,993,476 | B1 | 1/2006 | Dutta et al. |
| 7,039,643 | B2 * | 5/2006 | Sena et al. ........... 707/101 |
| 7,062,437 | B2 | 6/2006 | Kovales et al. |
| 7,130,850 | B2 | 10/2006 | Russell-Falla et al. |
| 7,171,411 | B1 | 1/2007 | Lewis et al. |

(Continued)

FOREIGN PATENT DOCUMENTS

WO   WO 0182139   11/2001

(Continued)

OTHER PUBLICATIONS

Text to Speech MP3 with Natural Voices 1.71, Published Oct. 5, 2004.

(Continued)

*Primary Examiner*—John R. Cottingham
*Assistant Examiner*—Sherief Badawi
(74) *Attorney, Agent, or Firm*—Edward J. Lenart; Libby Z. Toub; Biggers & Ohanian LLP.

(57) ABSTRACT

Methods, systems, and computer program products are provided for providing disparate content as a playlist of media files for rendering on a portable media player. Embodiments include aggregating content of disparate data formats from disparate data sources, wherein the aggregated content is in a data format incompatible with the portable media player; assigning a portion of the aggregated content to a channel; creating a plurality of media files including the portion of the aggregated content assigned to the channel, the media files being in a data format compatible with the portable media player; and storing the plurality of media files as a playlist.

10 Claims, 11 Drawing Sheets

U.S. PATENT DOCUMENTS

| | | | |
|---|---|---|---|
| 7,356,470 | B2 | 4/2008 | Roth et al. |
| 7,454,346 | B1 | 11/2008 | Dodrill et al |
| 2001/0027396 | A1 | 10/2001 | Sato |
| 2001/0047349 | A1 | 11/2001 | Easty et al. |
| 2001/0049725 | A1 | 12/2001 | Kosuge |
| 2001/0054074 | A1 | 12/2001 | Hayashi |
| 2002/0013708 | A1 | 1/2002 | Walker et al. |
| 2002/0032564 | A1 | 3/2002 | Ehsani et al. |
| 2002/0032776 | A1 | 3/2002 | Hasegawa et al. |
| 2002/0054090 | A1 | 5/2002 | Silva et al. |
| 2002/0062216 | A1 | 5/2002 | Guenther et al. |
| 2002/0062393 | A1 | 5/2002 | Borger et al. |
| 2002/0095292 | A1 | 7/2002 | Mittal et al. |
| 2002/0152210 | A1 | 10/2002 | Johnson et al. |
| 2002/0178007 | A1 | 11/2002 | Slotznick et al. |
| 2002/0194286 | A1* | 12/2002 | Matsuura et al. ............ 709/206 |
| 2002/0198720 | A1 | 12/2002 | Takagi et al. |
| 2003/0028380 | A1 | 2/2003 | Freeland et al. |
| 2003/0033331 | A1* | 2/2003 | Sena et al. ................. 707/513 |
| 2003/0055868 | A1 | 3/2003 | Fletcher et al. |
| 2003/0103606 | A1 | 6/2003 | Rhie et al. |
| 2003/0110272 | A1* | 6/2003 | du Castel et al. ............ 709/229 |
| 2003/0110297 | A1 | 6/2003 | Tabatabai et al. |
| 2003/0115056 | A1 | 6/2003 | Gusler et al. |
| 2003/0115064 | A1 | 6/2003 | Gusler et al. |
| 2003/0126293 | A1* | 7/2003 | Bushey ....................... 709/246 |
| 2003/0158737 | A1 | 8/2003 | Csicsatka |
| 2003/0160770 | A1 | 8/2003 | Zimmerman |
| 2003/0167234 | A1 | 9/2003 | Bodmer et al. |
| 2003/0172066 | A1 | 9/2003 | Cooper et al. |
| 2004/0003394 | A1 | 1/2004 | Ramaswamy |
| 2004/0041835 | A1 | 3/2004 | Lu |
| 2004/0068552 | A1 | 4/2004 | Kotz et al. |
| 2004/0088349 | A1 | 5/2004 | Beck et al. |
| 2004/0199375 | A1 | 10/2004 | Ehsani et al. |
| 2004/0201609 | A1 | 10/2004 | Obrador |
| 2004/0254851 | A1 | 12/2004 | Himeno et al. |
| 2005/0015254 | A1 | 1/2005 | Bearman |
| 2005/0045373 | A1 | 3/2005 | Born |
| 2005/0071780 | A1* | 3/2005 | Muller et al. ............... 715/825 |
| 2005/0076365 | A1 | 4/2005 | Popov et al. |
| 2005/0108521 | A1 | 5/2005 | Silhavy et al. |
| 2005/0232242 | A1 | 10/2005 | Karaoguz et al. |
| 2006/0008258 | A1 | 1/2006 | Kawana et al. |
| 2006/0020662 | A1 | 1/2006 | Robinson |
| 2006/0048212 | A1 | 3/2006 | Tsuruoka et al. |
| 2006/0050794 | A1 | 3/2006 | Tan et al. |
| 2006/0052089 | A1 | 3/2006 | Khurana et al. |
| 2006/0075224 | A1 | 4/2006 | Tao |
| 2006/0095848 | A1 | 5/2006 | Naik |
| 2006/0123082 | A1 | 6/2006 | Digate et al. |
| 2006/0136449 | A1* | 6/2006 | Parker et al. ................ 707/101 |
| 2006/0140360 | A1 | 6/2006 | Crago et al. |
| 2006/0155698 | A1 | 7/2006 | Vayssiere |
| 2006/0159109 | A1 | 7/2006 | Lamkin et al. |
| 2006/0173985 | A1 | 8/2006 | Moore |
| 2006/0184679 | A1 | 8/2006 | Izdepski et al. |
| 2006/0190616 | A1 | 8/2006 | Mayerhofer et al. |
| 2006/0224739 | A1* | 10/2006 | Anantha ...................... 709/226 |
| 2006/0233327 | A1* | 10/2006 | Roberts et al. ........... 379/88.23 |
| 2006/0265503 | A1 | 11/2006 | Jones et al. |
| 2006/0288011 | A1 | 12/2006 | Gandhi et al. |
| 2007/0027958 | A1 | 2/2007 | Haslam |
| 2007/0061266 | A1 | 3/2007 | Moore et al. |
| 2007/0073728 | A1* | 3/2007 | Klein et al. .................... 707/10 |
| 2007/0083540 | A1* | 4/2007 | Gundla et al. ............... 707/101 |
| 2007/0091206 | A1 | 4/2007 | Bloebaum |
| 2007/0100836 | A1 | 5/2007 | Eichstaedt et al. |
| 2007/0112844 | A1* | 5/2007 | Tribble et al. ............... 707/102 |
| 2007/0118426 | A1 | 5/2007 | Barnes, Jr. |
| 2007/0124458 | A1 | 5/2007 | Kumar |
| 2007/0124802 | A1 | 5/2007 | Anton et al. |
| 2007/0130589 | A1 | 6/2007 | Davis et al. |
| 2007/0174326 | A1 | 7/2007 | Schwartz et al. |
| 2007/0191008 | A1 | 8/2007 | Bucher et al. |
| 2007/0192327 | A1 | 8/2007 | Bodin |
| 2007/0192674 | A1 | 8/2007 | Bodin |
| 2007/0192683 | A1 | 8/2007 | Bodin |
| 2007/0192684 | A1 | 8/2007 | Bodin et al. |
| 2007/0208687 | A1 | 9/2007 | O'Connor et al. |
| 2007/0213857 | A1 | 9/2007 | Bodin |
| 2007/0213986 | A1 | 9/2007 | Bodin |
| 2007/0214147 | A1 | 9/2007 | Bodin et al. |
| 2007/0214148 | A1 | 9/2007 | Bodin |
| 2007/0214149 | A1 | 9/2007 | Bodin |
| 2007/0214485 | A1 | 9/2007 | Bodin |
| 2007/0220024 | A1* | 9/2007 | Putterman et al. ........... 707/101 |
| 2007/0253699 | A1* | 11/2007 | Yen et al. ..................... 396/311 |
| 2007/0276837 | A1 | 11/2007 | Bodin et al. |
| 2007/0276865 | A1 | 11/2007 | Bodin et al. |
| 2007/0276866 | A1 | 11/2007 | Bodin et al. |
| 2007/0277088 | A1 | 11/2007 | Bodin |
| 2007/0277233 | A1 | 11/2007 | Bodin |
| 2008/0034278 | A1* | 2/2008 | Tsou et al. ................... 715/203 |
| 2008/0052415 | A1* | 2/2008 | Kellerman et al. .......... 709/246 |
| 2008/0082576 | A1 | 4/2008 | Bodin |
| 2008/0082635 | A1 | 4/2008 | Bodin |
| 2008/0161948 | A1 | 7/2008 | Bodin |
| 2008/0162131 | A1 | 7/2008 | Bodin |
| 2008/0275893 | A1 | 11/2008 | Bodin et al. |

FOREIGN PATENT DOCUMENTS

WO    WO 2005/106846    11/2005

OTHER PUBLICATIONS

Managing multimedia content and delivering services across multiple client platforms using XML, London Communications Symposium, xx, xx, Sep. 10, 2002, pp. 1-7.

PCT Search Report and Written Opinion International Application PCT/EP2007/050594.

Adapting Multimedia Internet Content for Universal Access, Rakesh Mohan, John R. Smith, Chung-Sheng Li, IEEE Transactions on Multimedia vol. 1, No. 1, p. 104-p. 144.

Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.
Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.
Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.

* cited by examiner

PROVIDING DISPARATE CONTENT AS A PLAYLIST OF MEDIA FILES

BACKGROUND OF THE INVENTION

1. Field of the Invention

The field of the invention is data processing, or, more specifically, methods, systems, and products for providing disparate content as a playlist of media files.

2. Description of Related Art

Many conventional portable media players include display screens for displaying metadata associated with the media files supported by the portable media players in addition to being capable of playing the media files themselves. Such portable media players are often lightweight and portable making the portable media players user friendly. Despite the fact that the portable media players are lightweight, portable, and include display screens, such digital media players have often support limited file formats.

SUMMARY OF THE INVENTION

Methods, systems, and computer program products are provided for providing disparate content as a playlist of media files for rendering on a portable media player. Embodiments include aggregating content of disparate data formats from disparate data sources, wherein the aggregated content is in a data format incompatible with the portable media player; assigning a portion of the aggregated content to a channel; creating a plurality of media files including the portion of the aggregated content assigned to the channel, the media files being in a data format compatible with the portable media player; and storing the plurality of media files as a playlist.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
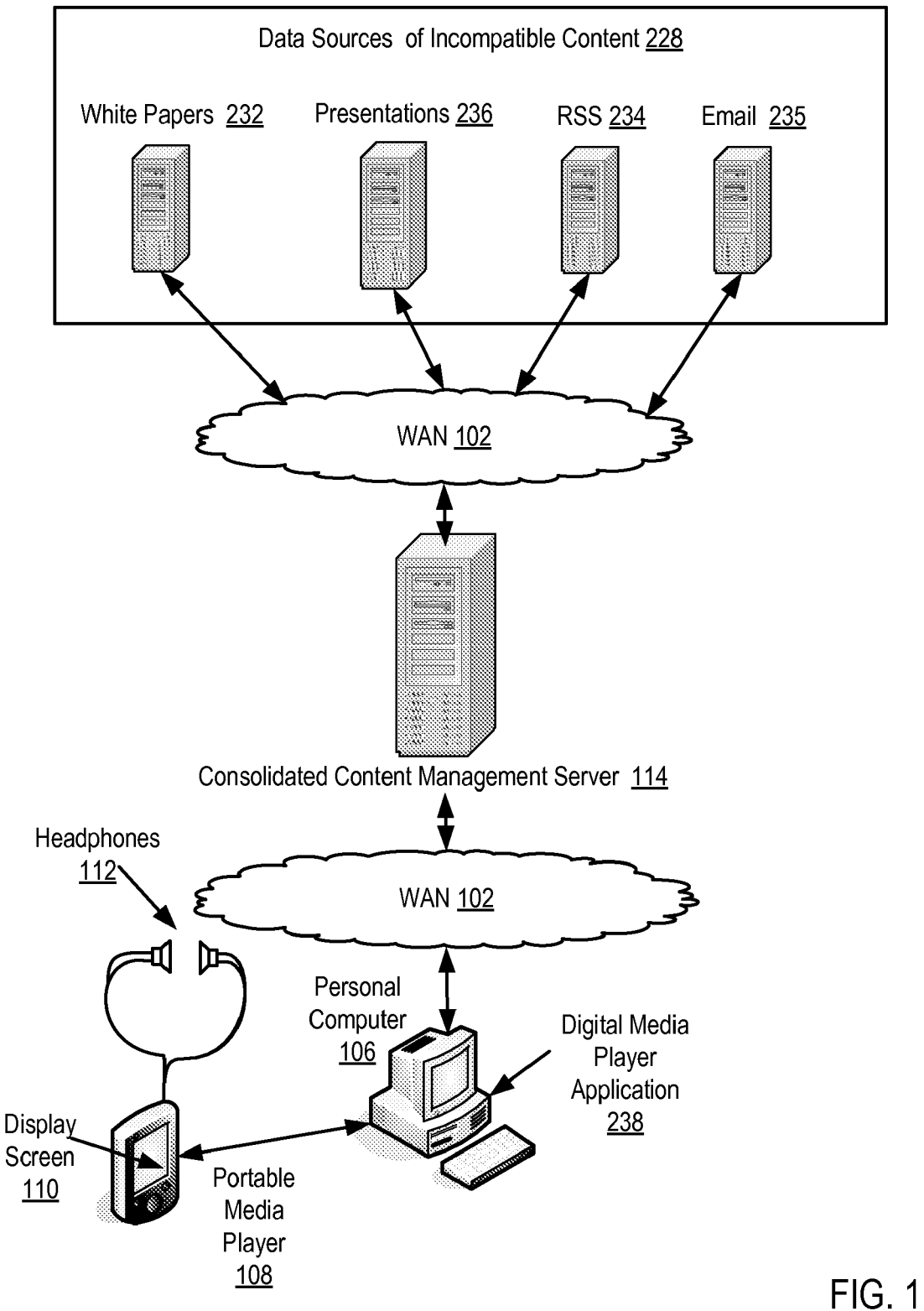
FIG. 1 sets forth a network diagram illustrating an exemplary system for providing disparate content as a playlist of media files according to embodiments of the present invention.

Exemplary methods, systems, and products for providing disparate content as a playlist of media files are described with reference to the accompanying drawings, beginning with FIG. 1. FIG. 1 sets forth a network diagram illustrating an exemplary system for providing disparate content as a playlist of media files according to embodiments of the present invention. The system of FIG. 1 is capable of providing disparate content as a playlist of media files for rendering on a portable media player by aggregating content of disparate data formats from disparate data sources. The aggregated content is in a data format incompatible with the portable media player. The system of FIG. 1 is further capable of assigning a portion of the aggregated content to a channel and creating a plurality of media files including the portion of the aggregated content assigned to the channel. The media files are created in a data format compatible with the portable media player. The system of FIG. 1 is further capable of storing the plurality of media files as a playlist.

The system of FIG. 1 includes a consolidated content management server (114) coupled for data communications with a personal computer (106) through a wide area network (102) ('WAN'). The consolidated content management server (114) of FIG. 1 includes computer program instructions capable of providing disparate content as a playlist of media files for rendering on a portable media player. The consolidated content management server is capable of aggregating content of disparate data formats from disparate data sources (228). The aggregated content from the disparate data sources (228) is in a data format incompatible with the portable media player.

In the example of FIG. 1, the disparate data sources (228) of incompatible content include a source of white papers (232). A white paper is an article that typically states an organization's position or philosophy about a social, political, or other subject, or a not-too-detailed technical explanation of an architecture, framework, or product technology. Typically, a white paper explains the results, conclusions, or construction resulting from some organized committee or research collaboration or design and development effort. Such white papers are often available in electronic form in Portable Document Format (.pdf) readable with Adobe® Acrobat, word processing documents readable with Microsoft Word and many others as will occur to those of skill in the art. Whitepapers are typically not available in data formats supported by display screens of portable media players.

The exemplary disparate data sources (228) of incompatible content of FIG. 1 also include a source of presentations (236). A presentation is typically created with presentation software (sometimes called "presentation graphics"), a category of application program used to create sequences of words and pictures that tell a story or help support a speech or public presentation of information. Presentation software can be divided into business presentation software and more general multimedia authoring tools, with some products having characteristics of both. Examples of presentation software include Microsoft's PowerPoint and Lotus's Freelance Graphics, Adobe Persuasion, Astound, Asymetrix Compel, Corel Presentations, and Harvard Graphics.

The exemplary disparate data sources (228) of incompatible content of FIG. 1 also include a source of RSS content (234). RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This content is typically delivered as an XML file called RSS feed, webfeed, RSS stream, or RSS channel.

The exemplary disparate data sources (228) of incompatible content of FIG. 1 also include an email server (235). An email server is an application that controls the distribution and storage of email.

The sources of incompatible content (228) of FIG. 1 are for explanation and not for limitation. In fact, portable media players typically support relatively few data formats, and therefore, incompatible content may be received from many disparate data sources in addition to those shown for example in FIG. 1 as will occur to those of skill in the art.

The consolidated content management server (114) of FIG. 1 is also capable of assigning a portion of the aggregated content to a channel. A channel is a logical organization of content sharing common attributes. The content organized in a channel is typically related such as by subject matter, associated user, content type, data format of the content, or any other attributes of the content. For example, content may be related to a user's work experience despite being in different data formats such as emails, whitepapers, presentations and so on. Such content may be assigned to 'work channel.' Other examples of channels include accumulating content of disparate data formats all relating to entertainment into an 'entertainment channel,' accumulating content of disparate data formats all relating to a user's work into an 'work channel,' or accumulating content of disparate data formats all relating to a user's family into a 'family channel.' The consolidated content management server (114) of FIG. 1 is capable of assigning a portion of the aggregated content to a channel by identifying attributes of the aggregated content; characterizing the attributes of the aggregated content; and assigning a portion of the aggregated content to a predetermined channel in dependence upon characterized attributes and channel assignment rules as discussed below.

The consolidated content management server (114) of FIG. 1 is also capable of creating a plurality of media files including the portion of the aggregated content assigned to the channel. The consolidated content management server creates media files in a data format compatible with the portable media player.

The consolidated content management server (114) of FIG. 1 is also capable of storing the plurality of media files as a playlist. A playlist is a predefined collection, and often sequence, or media files typically given a particular playlist name. Many conventional portable media players, such as the iPod® from Apple®, support playlists.

The consolidated content management server (114) of FIG. 1 is coupled for data communications with a personal computer (106) having installed upon it a digital media player application (232). A digital media player application (238) is an application that manages media content in media files such as audio files and video files. Such digital media player applications are typically capable of storing the media files on a portable media player. Examples of digital media player applications include Music Match™, iTunes®, Songbird™, and others as will occur to those of skill in the art.

The digital media player application (238) is capable of receiving the playlist of media files from the consolidated content management server (114) and storing the playlist on the portable media player (108). The portable media player (108) of FIG. 1 is also capable of rendering the plurality of media files of the playlist on the portable media player. Examples of portable media players include the iPod® from Apple and Creative Zen Vision from Creative labs. Rendering the plurality of media files may include playing the audio portion of a media file included in the playlist or displaying text or images associated with the media file on a display screen (110) of portable media player.

Rendering the plurality of media files of the playlist on the portable media player advantageously allows a user to make use of a channel of related content originally available in incompatible data formats in a user-friendly manner by making use of the playlist capability already built into many portable media players. A work related presentation originally provided by a source of presentation in Microsoft PowerPoint, a work related email originally provided by an email server, and a work related RSS feed may, for example, be viewed as a series of work channel media files organized as a playlist on an Apple iPod that does not support PowerPoint, conventional email, or conventional RSS.

In the example of FIG. 1, the consolidated content management server (114) of FIG. 1 provides the disparate content as a playlist of media files for rendering on a portable media player according to the present invention. This is for explanation, and not for limitation. In fact, systems for providing disparate content as a playlist of media files for rendering on a portable media player according to the present invention may be implemented in less distributed environments. The data sources of incompatible content, the modules for providing disparate content as a playlist of media files for rendering on a portable media player, and the digital media player application for storing the playlist on a portable media player may reside in a single computer, or in distributed environments of any varying scope.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

Various embodiments of the present invention may be implemented on a variety of hardware platforms in addition to those illustrated in FIG. 1.

Figure 2:
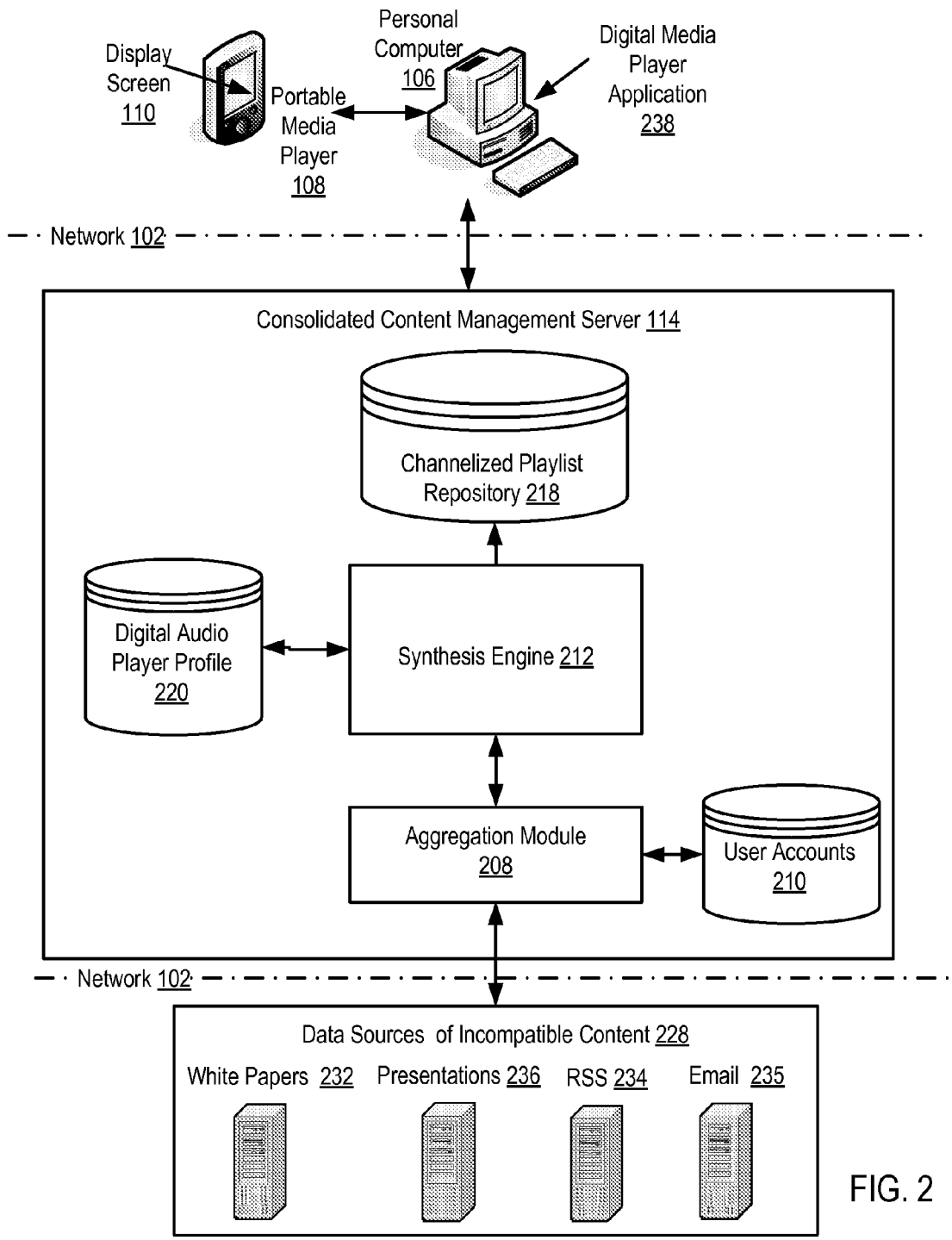
FIG. 2 sets forth a block diagram depicting a system for providing disparate content as a playlist of media files for rendering on a portable media player according to the present invention.

For further explanation, FIG. 2 sets forth a block diagram depicting a system for providing disparate content as a playlist of media files for rendering on a portable media player (108) according to the present invention. The system of FIG. 2 includes a portable media player (108) capable of rendering the plurality of media files of the playlist on the portable media player. Such media files may be rendered as audio by playing the audio portion of the media file or by displaying text or images associated with the media file on the display screen (110) of the portable media player (108).

In the example of FIG. 2, a digital media player application (232) is capable of receiving the media files stored as a playlists from a channelized playlist repository (218) of a consolidated content management server (114) and storing the playlist on the portable media player (108).

The consolidated content management server (114) of FIG. 2 is capable providing disparate content as a playlist of media files for rendering on a portable media player by aggregating content of disparate data formats from disparate data sources, wherein the aggregated content is in a data format incompatible with the portable media player; assigning a portion of the aggregated content to a channel; creating a plurality of media files including the portion of the aggregated content assigned to the channel, the media files being in a data format compatible with the portable media player; and storing the plurality of media files as a playlist.

The consolidated content management server (114) of FIG. 2 includes an aggregation module (208). The aggregation module (208) of FIG. 2 is implemented as computer program instructions for aggregating content of disparate data formats from disparate data sources in a data format incompatible with the portable media player. The exemplary aggregation module (208) is capable generally of aggregating content of disparate data formats from disparate data sources in accordance with an associated user account (210). Such a user account (210) typically includes user information such as a user ID and identifications of sources of incompatible content (228) identified by a user.

The consolidated content management server (114) of FIG. 2 also includes a synthesis engine (212). The synthesis engine of FIG. 2 is implemented as computer program instructions for assigning a portion of the aggregated content to a channel; creating a plurality of media files including the portion of the aggregated content assigned to the channel and storing the plurality of media files as a playlist. The synthesis engine (212) of FIG. 2 creates a plurality of media files in a data format identified in a portable media player profile (220) maintained by the consolidated content management server (114). Portable media player profiles typically include an identification of the target portable media player and an identification of one or more image file formats that the target portable media player supports.

The consolidated content management server (114) includes channelized playlist repository (218) of playlists for rendering on the portable media player (108). Maintaining a channelized playlist repository (218) of playlists provides a single point of access at the consolidated content management server for related content derived from incompatible data formats and assigned to a channel now capable of being rendered in, for example, audio and images, on the portable media player.

Providing disparate content as a playlist of media files for rendering on a portable media player in accordance with the present invention is generally implemented with computers, that is, with automated computing machinery. In the systems of FIGS. 1 and 2, for example, all the nodes, servers, and communications devices are implemented to some extent at least as computers. For further explanation, therefore, FIG. 3 sets forth a block diagram of automated computing machinery comprising an exemplary consolidated content management server (114) useful in providing disparate content as a playlist of media files for rendering on a portable media player according to embodiments of the present invention. The consolidated content management server (114) of FIG. 3 includes at least one computer processor (156) or 'CPU' as well as random access memory (168) ('RAM') which is connected through a system bus (160) to a processor (156) and to other components of the consolidated content management server (114).

Stored in RAM (168) is an exemplary consolidated content management module (140), computer program instructions for providing disparate content as a playlist of media files for rendering on a portable media player according to the present invention. The consolidated content management module (140) of FIG. 3 includes an aggregation module (208), computer program instructions for aggregating content of disparate data formats from disparate data sources in a data format incompatible with the portable media player. The exemplary aggregation module is capable generally of aggregating content of disparate data formats from disparate data sources in accordance with an associated user account. Such a user account typically includes user information such as a user ID and identifications of sources of incompatible content identified by a user to be rendered on the portable media player.

Figure 3:
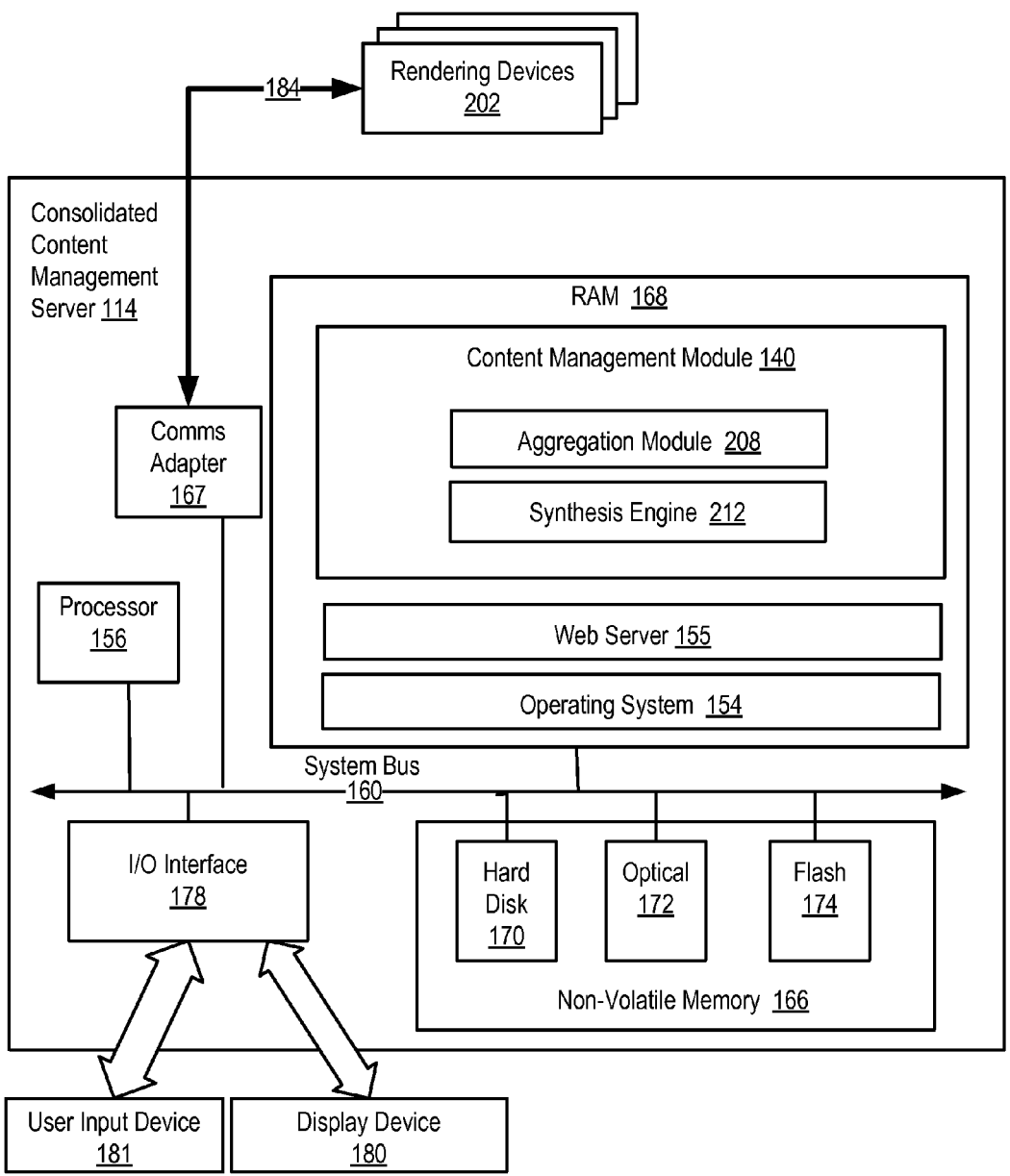
FIG. 3 sets forth a block diagram of automated computing machinery comprising an exemplary consolidated content management server useful in providing disparate content as a playlist of media files for rendering on a portable media player according to embodiments of the present invention.

The consolidated content management module (140) of FIG. 3 also includes a synthesis engine (212) computer program instructions for assigning a portion of the aggregated content to a channel; creating a plurality of media files including the portion of the aggregated content assigned to the channel; and storing the plurality of media files as a playlist. The synthesis engine (212) of FIG. 3 is capable of creating a plurality of media files in a data format identified in a portable media player profile maintained by the consolidated content management server (114).

The exemplary consolidated content management server (114) of FIG. 3 also includes a web server (155). The consolidated content management server may usefully provide channelized playlists of media files created from incompatible content through the use of programs that run on a web server and build web pages, such as for example, servlets. Such programs may build dynamic server pages such as for example Java Server Pages ('JSP'). One such web server useful in providing disparate content as a playlist of media files for rendering on a portable media player according to the present invention is the WebSphere® Application Server available from IBM. WebSphere Application Server is a Java™-based application platform, integrating enterprise data and transactions for the dynamic e-business. WebSphere Application Server delivers a rich application deployment environment with application services that provide transaction management, security, performance, availability, connectivity, and scalability.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art.

The exemplary consolidated content management server (114) of FIG. 3 includes non-volatile computer memory (166) coupled through a system bus (160) to a processor (156) and to other components of the consolidated content management server (114). Non-volatile computer memory (166) may be implemented as a hard disk drive (170), an optical disk drive (172), an electrically erasable programmable read-only memory space (so-called 'EEPROM' or 'Flash' memory) (174), RAM drives (not shown), or as any other kind of computer memory as will occur to those of skill in the art.

The exemplary consolidated content management server (114) of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary consolidated content management server (114) of FIG. 3 includes a communications adapter (167) for implementing data communications (184) with rendering devices (202). Such data communications may be carried out serially through RS-232 connections, through external buses such as a USB, through data communications networks such as IP networks, and in other ways as will occur to those of skill in the art. Communications adapters implement the hardware level of data communications through which one computer sends data communications to another computer, directly or through a network. Examples of communications adapters useful for providing disparate content as a playlist of media files for rendering on a portable media player include modems for wired dial-up communications, Ethernet (IEEE 802.3) adapters for wired network communications, and 802.11b adapters for wireless network communications and other as will occur to those of skill in the art.

As discussed above, to display the media files stored as a playlist on a portable media player, the playlist of media files typically must be stored on the portable media player. A digital media player application running on a personal computer may be used to manage content for delivery to portable media players. For further explanation, therefore, FIG. 4 sets a block diagram of automated computing machinery comprising an exemplary computer (152) useful in providing disparate content as a playlist of media files for rendering on a portable media player according to the present invention. The computer (152) of FIG. 4 includes at least one computer processor (470) or 'CPU' as well as random access memory (450) ('RAM') which is connected through a system bus (160) to processor (470) and to other components of the computer.

Stored in RAM (450) is an operating system (456). Operating systems useful in computers according to embodiments of the present invention include UNIX™, Linux™, Microsoft XP™, AIX™, IBM's i5/OS™, and others as will occur to those of skill in the art.

Also stored in RAM (450) is a digital media player application (238). A digital media player application (238) is an application that manages media content in media files such as audio files and video files. Such digital media player applications are typically capable of storing media files on a portable media player. Examples of digital media player applications include Music Match™, iTunes® and others as will occur to those of skill in the art. The digital media player application (238) of FIG. 4 is capable of storing a playlist of media files created from incompatible content and assigned to a channel onto a portable media player.

As discussed above, providing disparate content as a playlist of media files for rendering on a portable media player according to the present invention is not limited to the distributed environments depicted in the examples of FIGS. 1 and 2. In fact, providing disparate content as a playlist of media files for rendering on a portable media player may be usefully carried out using a single computer. In the example of FIG. 4, therefore, also stored in RAM is an aggregation module (452) computer program instructions for aggregating content of disparate data formats from disparate data sources in a data format incompatible with the portable media player. The exemplary aggregation module (452) is capable generally of aggregating content of disparate data formats from disparate data sources in accordance with an associated user account. Such a user account typically includes user information such as a user ID and identifications of sources of incompatible content identified by a user to be rendered on the portable media player.

Also stored in RAM is a synthesis engine (454) computer program instructions for assigning a portion of the aggregated content to a channel; creating a plurality of media files including the portion of the aggregated content assigned to the channel; and storing the plurality of media files as a playlist. The synthesis engine (212) of FIG. 3 is capable of creating a plurality of media files in a data format identified in a portable media player profile (220) maintained by the consolidated content management server (114).

Figure 4:
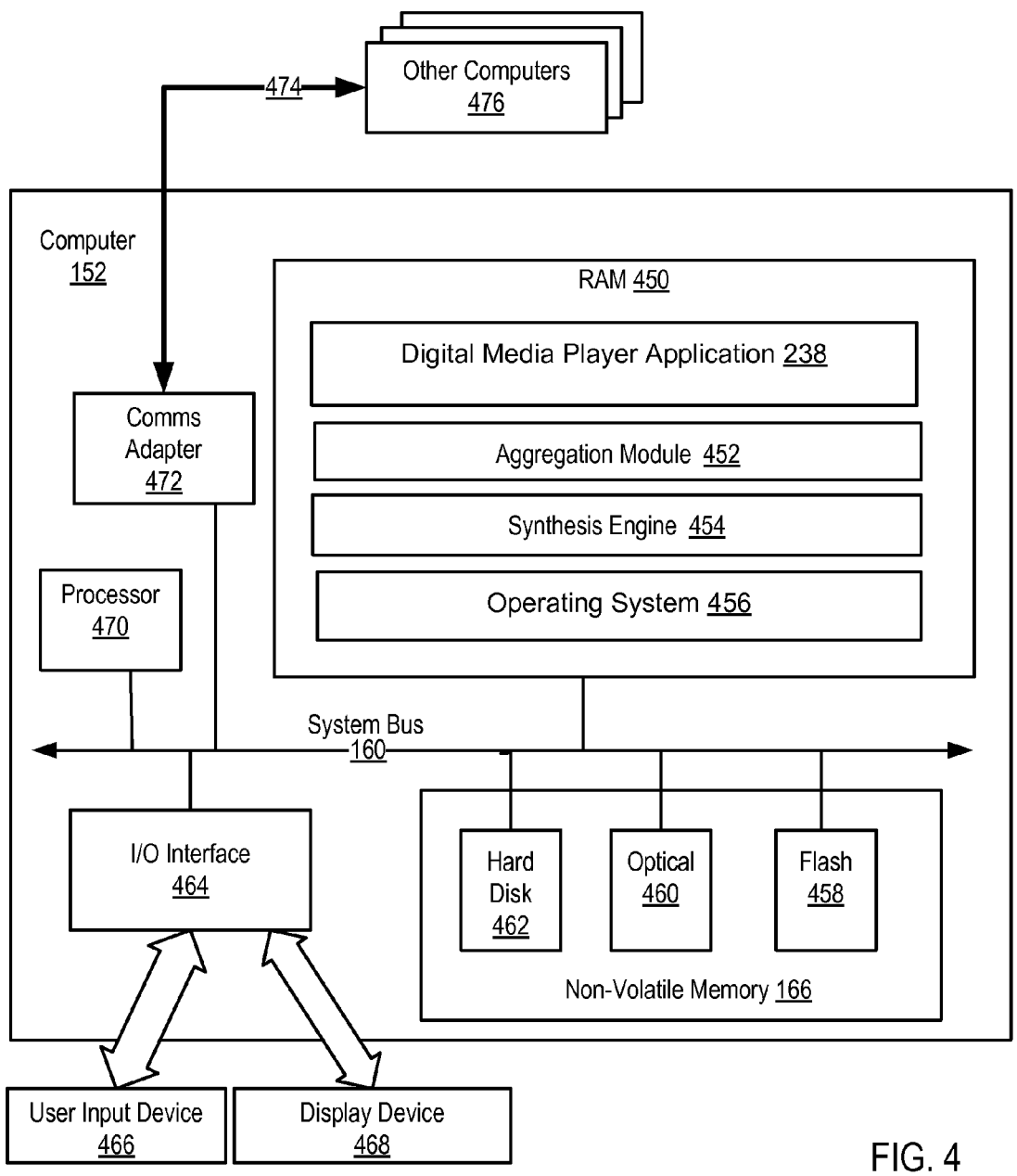
FIG. 4 sets a block diagram of automated computing machinery comprising an exemplary computer useful in providing disparate content as a playlist of media files for rendering on a portable media player according to the present invention.

The operating system (456), digital media player application (238), aggregation module (452), and synthesis engine (454) in the example of FIG. 4 are shown in RAM (450), but many components of such software may be stored in non-volatile memory (166) also.

Computer (152) of FIG. 4 includes non-volatile computer memory (166) coupled through a system bus (160) to processor (470) and to other components of the computer (152). Non-volatile computer memory (166) may be implemented as a hard disk drive (462), optical disk drive (460), electrically erasable programmable read-only memory space (so-called 'EEPROM' or 'Flash' memory) (458), RAM drives (not shown), or as any other kind of computer memory as will occur to those of skill in the art.

The example computer of FIG. 4 includes one or more input/output interface adapters (464). Input/output interface adapters in computers implement user-oriented input/output through, for example, software drivers and computer hardware for controlling output to display devices (468) such as computer display screens, as well as user input from user input devices (466) such as keyboards and mice.

The exemplary computer (152) of FIG. 4 includes a communications adapter (472) for implementing data communications (474) with other computers (476). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for providing disparate content as a playlist of media files for rendering on a portable media player according to embodiments of the present invention include modems for wired dial-up communications, Ethernet (IEEE 802.3) adapters for wired network communications, and 802.11b adapters for wireless network communications.

Figure 5:
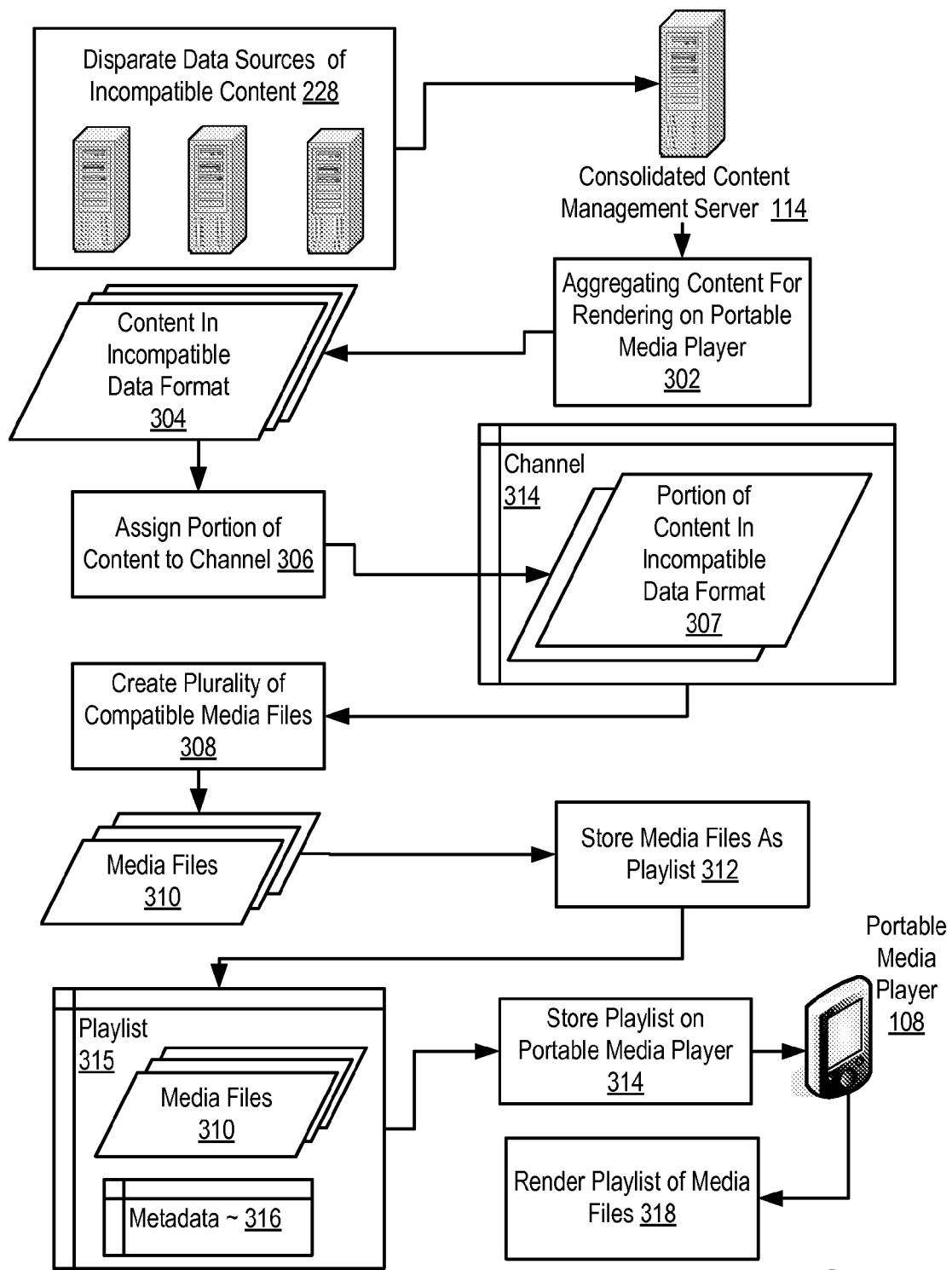
FIG. 5 sets forth a flow chart illustrating an exemplary computer-implemented method for providing disparate content as a playlist of media files for rendering on a portable media player.

For further explanation, FIG. 5 sets forth a flow chart illustrating an exemplary computer-implemented method for providing disparate content as a playlist of media files for rendering on a portable media player. The method of FIG. 5 includes aggregating (302) content (304) of disparate data formats from disparate data sources, wherein the aggregated content (304) is in a data format incompatible with the portable media player (108). As discussed above, aggregating (302) content (304) of disparate data formats from disparate data sources is typically carried out in dependence upon a user account. A user account typically associates with a user a plurality of identified data sources from various user preferences for aggregating the content as well as preferences for assigning content to one or more predefined channels.

As discussed above, aggregating (302) content (304) of disparate data formats from disparate data sources according to the method of FIG. 5 typically includes retrieving content in disparate data formats from identified disparate data sources associated with the user account. Retrieving content in disparate data formats may be carried out by retrieving the content from memory locally, downloading the content from a network location, or any other way of retrieving content that will occur to those of skill in the art.

Some disparate data sources may require security information for accessing content. Aggregating (302) content (304) according to the method of FIG. 5 may therefore also include determining whether the identified data source requires security information to access the content and retrieving security information for the data source from the user account if the identified data source requires security information to access the content and presenting the security information to the data source to access the content.

Aggregating (302) content (304) of disparate data formats from disparate data sources according to the method of FIG. 5 also typically includes storing the retrieved content and associating the stored content with the user account. The stored content is typically maintained in memory available to a consolidated content management server.

The method of FIG. 5 also includes assigning (306) a portion (307) of the aggregated content to a channel (314). A channel is a logical organization of content sharing common attributes. The content organized in a channel is typically related such as by subject matter, associated user, content type, data format of the content, or any other attributes of the content. For example, content may be related to a user's work experience despite being in different data formats such as emails, whitepapers, presentations and so on. Such content may be assigned to 'work channel.' Other examples of channels include accumulating content of disparate data formats all relating to entertainment into an 'entertainment channel,' accumulating content of disparate data formats all relating to a user's work into an 'work channel,' or accumulating content of disparate data formats all relating to a user's family into a 'family channel.' Assigning (306) a portion (307) of the aggregated content to a channel (314) may be carried out by identifying attributes of the aggregated content (304); characterizing the attributes of the aggregated content; and assigning a portion of the aggregated content to a predetermined channel in dependence upon characterized attributes and channel assignment rules as discussed below with reference to FIG. 6.

The method of FIG. 5 also includes creating (308) a plurality of media files (310) including the portion (307) of the aggregated content assigned to the channel (314), the media files (310) being in a data format compatible with the portable media player (108). Creating a plurality of media files including the portion of the aggregated content assigned to the channel may be carried out by selecting content for inclusion in each media file of the playlist; extracting text from the content for inclusion in each media file of the playlist; creating the media file; and storing the extracted text of the selected content as metadata associated with the media file as discussed below with reference to FIG. 7. Creating a plurality of media files including the portion of the aggregated content assigned to the channel may also be carried out by selecting content for inclusion in each media file of the playlist; extracting an image from the content for inclusion in each media file of the playlist; creating the media file; and storing the extracted image of the selected content as metadata associated with the media file as discussed below with reference to FIG. 10. Creating a plurality of media files including the portion of the aggregated content assigned to the channel may also be carried out by selecting content for inclusion in each media file of the playlist; extracting text from the content for inclusion in each media file of the playlist and for audio rendering by the portable media player; creating the media file; converting the extracted text to speech; and recording the speech in the audio portion of the media file as discussed below with reference to FIG. 11.

The method of FIG. 5 also includes storing (312) the plurality of media files (310) as a playlist (315). Storing (312) the plurality of media files (310) as a playlist (315) may be carried out by naming the individual media files of the playlist and associating the names of the media files with a playlist, also typically having a name. The names of the media files may be associated with the playlist through the use of a metadata file, such as an eXtensible Markup Language ('XML file'). iTunes® from Apple®, for example, supports an XML library file containing metadata describing the content managed by iTunes. In iTunes, for example, media file names may be associated with one or more playlists through the XML library file.

The method of FIG. 5 may also include providing the plurality of media files for download from a URL. Providing the plurality of media files for download from a URL advantageously provides a single point of access for channelized playlists of media files created from incompatible content from disparate data sources.

The method of FIG. 5 also includes storing (319) the playlist (315) on the portable media player (108). Storing (319) the playlist (315) on the portable media player (108) may be carried out by copying individual media files of the playlist and the associated metadata onto the portable media player. Storing the playlist on the portable media player (108) may be carried out through the use of digital media player application such as, for example, iTunes®, MusicMatch™, Windows Media Player®, and others as will occur to those of skill in the art.

The method of FIG. 5 also includes rendering (318) the plurality of media files (310) of the playlist (315) on the portable media player (108). As discussed above, the media files may include text and images extracted from content in incompatible data formats and included as metadata in the media file. Rendering (318) media files (310) of the playlist (315) that contain extracted text and images included as metadata may be carried out by displaying the extracted text or images on the display screen of the portable media player (108). Alternatively, the media files may contain a speech presentation of the content in incompatible data formats. Rendering (318) media files (310) of the playlist (315) that contain speech presentations may therefore be carried out by playing the audio portion of the media file on the portable media player (108).

As discussed above, providing disparate content as a playlist of media files for rendering on a portable media player according to the present invention includes assigning a portion of the aggregated content to a channel. For further explanation, therefore, FIG. 6 sets forth a flow chart illustrating an exemplary method for assigning (306) a portion (307) of the aggregated content (304) to a channel (314). The method of FIG. 6 includes identifying (402) attributes (404) of the aggregated content (304). Attributes of the aggregated content are aspects of the content which may be used to characterize the aggregated content. Exemplary attributes include the subject matter of the content, metadata present in the content, logical structure of the data, presence of particular keywords in the content, the source of the content, the application that created the content, URL of the source of the content, the data format of the content, author of the content, subject, and so on. Identifying attributes of the aggregated content may be carried out by comparing the contents of the content and the data format of the content with a list of predefined attributes. Another way that identifying attributes of the aggregated content may be carried out by comparing metadata associated with the aggregated content with a list of predefined attributes.

Figure 6:
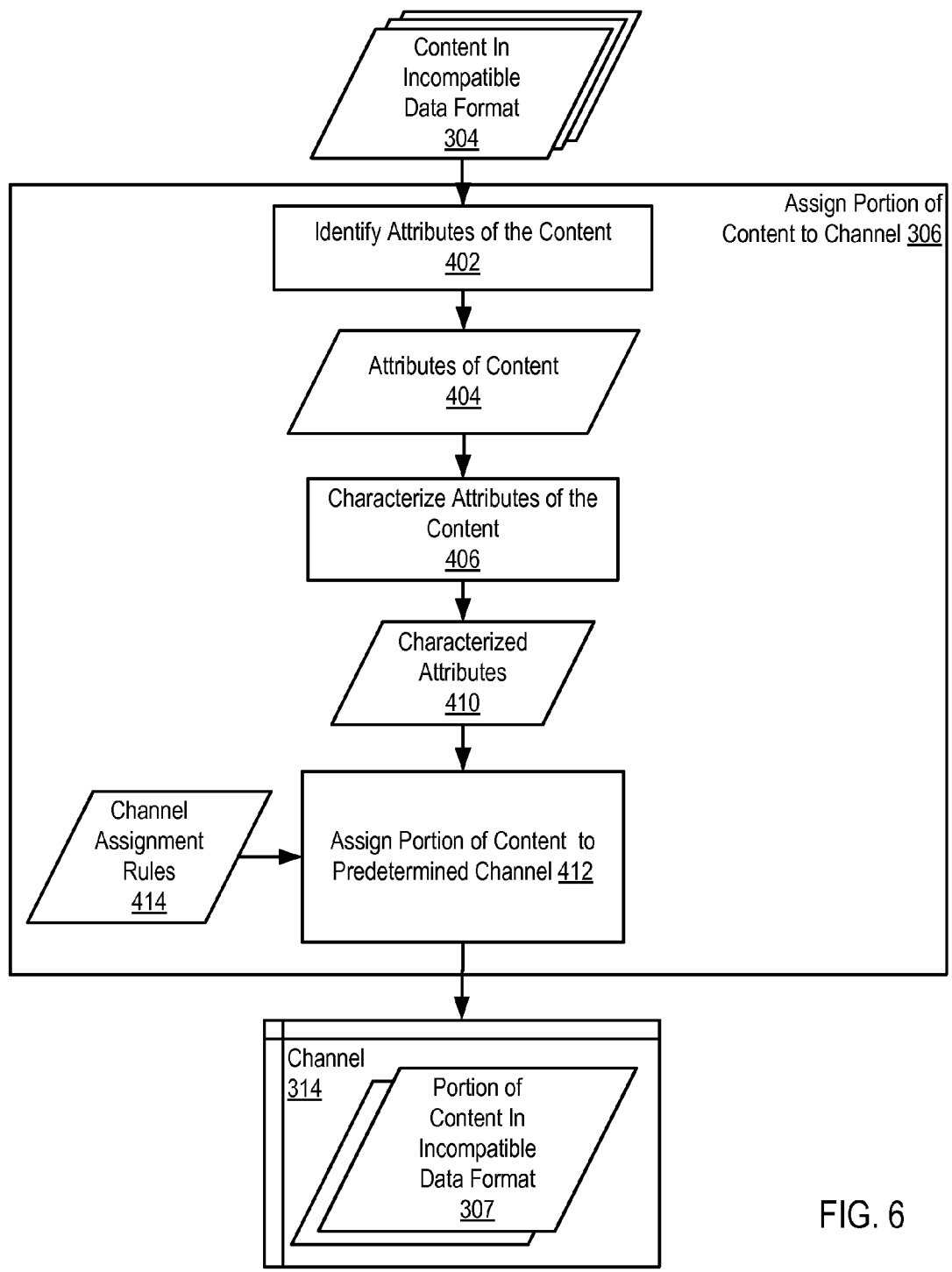
FIG. 6 sets forth a flow chart illustrating an exemplary method for assigning a portion of the aggregated content to a channel.

The method of FIG. 6 also includes characterizing (406) the attributes (404) of the aggregated content (304). Characterizing (406) the attributes (404) of the aggregated content (304) may be carried out by evaluating the identified attributes of the synthesized data. Evaluating the identified attributes of the aggregated content may include applying a characterization rule to an identified attribute. For further explanation consider the following characterization rule:

If content=email; AND
If email to="Joe"; AND
If email from ="Bob";
  Then email='work related email.'

In the example above, the characterization rule dictates that if the attributes of the content identify the content as an email and identify the email was sent to "Joe" and identify the email was sent from "Bob" then the exemplary email is characterized as a 'work email.'

The method of FIG. 6 also includes assigning (412) the portion (307) of the aggregated content (304) to a predetermined channel (314) in dependence upon characterized attributes (410) and channel assignment rules (414). Channel assignment rules are predetermined instructions for assigning content to a channel in dependence upon characterized attributes. Consider for further explanation the following channel assignment rule:

If content='email'; and
If Characterization of attributes='work related email'
  Then channel='work channel.'

In the example channel assignment rule above, if the content is an email and if the email has been characterized as 'work related email' then the content is assigned to a 'work channel.'

Under some channel assignment rules, content may be assigned to more than one channel. That is, the same content may in fact be applicable to more than one channel. Assigning a portion of the aggregated content to a predetermined channel (314) may therefore be carried out more than once for a single item of the aggregated content.

As discussed above, rendering one or more of the plurality of media files may include rendering text extracted from aggregated content included in playlist and associated with the media file as metadata. For further explanation, therefore, FIG. 7 sets forth a flow chart illustrating an exemplary method for creating a plurality of media files including the portion of the aggregated content assigned to the channel that includes extracting text from a portion of the aggregated content for visual display on a display screen of a portable media player.

Figure 7:
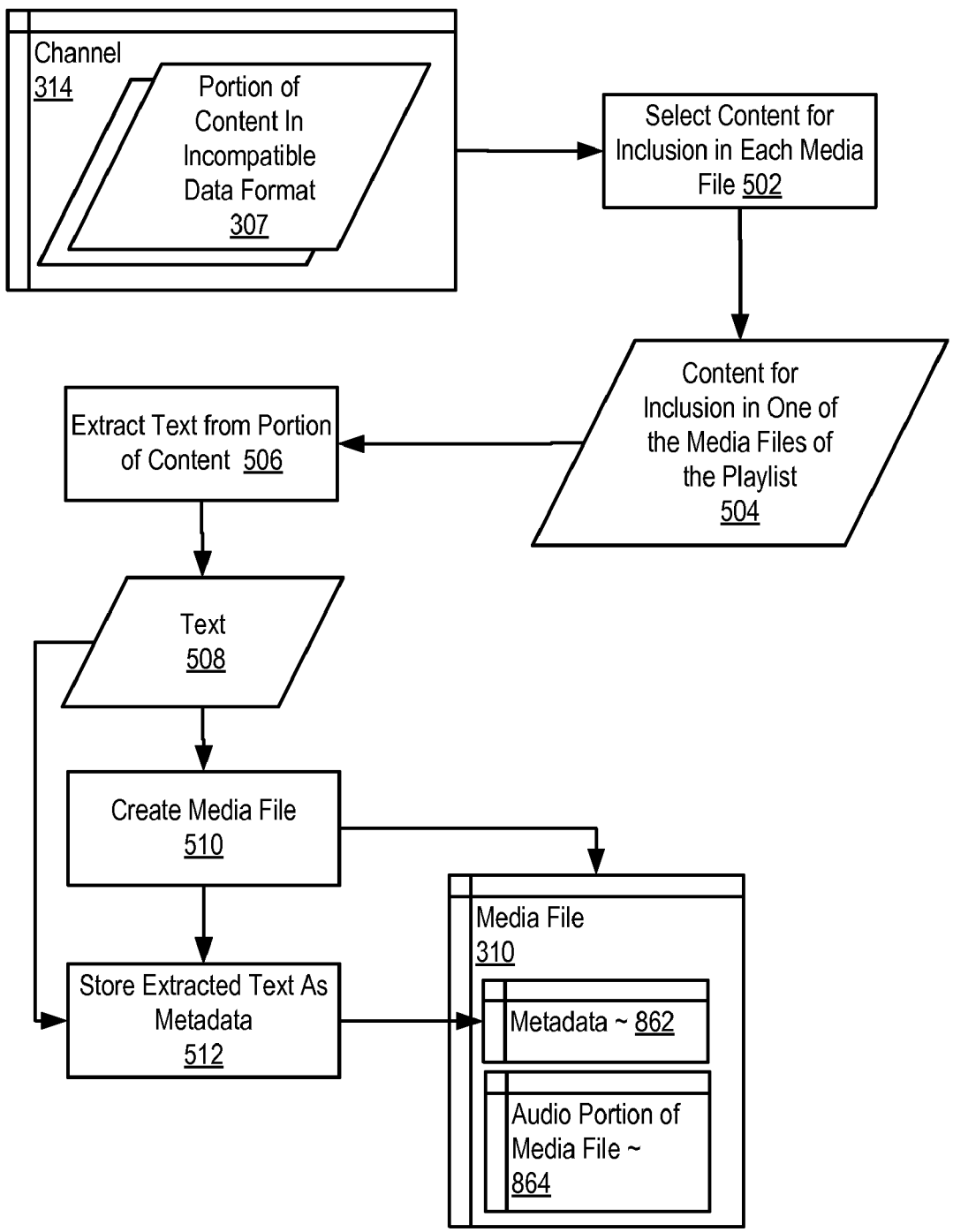
FIG. 7 sets forth a flow chart illustrating an exemplary method for creating a plurality of media files including the portion of the aggregated content assigned to the channel that includes extracting text from a portion of the aggregated content for visual display on a display screen of a portable media player.

The method of FIG. 7 includes selecting (502) content (504) for inclusion in each media file of the playlist. Selecting (502) content (5045) for inclusion in each media file of the playlist may be carried out by identifying a single file of the portion of aggregated content assigned to the channel. Selecting (502) content (504) for inclusion in each media file of the playlist may also be carried out by identifying specific content in a document, file or data structure of the portion of aggregated content assigned to the playlist.

The method of FIG. 7 includes extracting (506) text (508) from the content (504) for inclusion in each media file of the playlist. Extracting (506) text (508) from the content (504) for inclusion in each media file of the playlist may be carried out in a number of ways depending upon the data format of the content from which the text is extracted. Consider for example, an email message. RFC 822 outlines a standard specifying the syntax for messages within the framework of email. The principal parts of an email message are the header, the body, and any attachments to the email. The header contains information including sender, intended recipient, date, intended courtesy copy recipients, subject of the message, and others as will occur to those of skill in the art. The body of the email message contains the content of the message itself. The attachments are typically files attached to the email message. Extracting (506) text (508) from an email message for inclusion in a media file of the playlist may be carried out by extracting text from an email message header. Extracting text from the email message for inclusion in the media file may also include extracting text from an email message body.

Consider for further explanation, extracting (506) text (508) from RSS content for inclusion in each media file of the playlist. RSS content is typically presented in a web page or other markup document accessible through a browser. Such a web page or markup document therefore includes display text and images for display to a user and markup dictating the presentation of the content. Extracting (506) text (508) from RSS content (504) for inclusion in a media file of the playlist therefore may be carried out by retrieving display text from a web page or markup document. Such extracted display text implements some or all of the text content of the RSS content available through the RSS feed.

The examples of extracting text from email messages and RSS content are presented for explanation and not for limitation. In fact, text may be extracted from content in many data formats incompatible with a digital media player such as for example content in word processing documents, spreadsheets, presentation graphics and many others as will occur those of skill in the art and all such ways of extracting text are within the scope of the present invention.

The method of FIG. 7 also includes creating (510) the media file (310). Examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. Creating a media file typically includes creating a media file that is supported by a portable media player upon which the playlist is to be rendered.

The method of FIG. 7 also includes storing (512) the extracted text (508) of the selected content (504) as metadata (862) associated with the media file (310). Storing (512) the extracted text (508) of the selected content (504) as metadata (862) associated with the media file (310) may be carried out by inserting the extracted text in the media file itself, such as by inserting the extracted text in an ID3 tag in an MPEG file as discussed below with reference to FIG. 8. Storing (512) the extracted text (508) of the selected content (504) as metadata (862) associated with the media file (310) also may be carried out by storing the extracted text in a metadata file associated with the media file such as by storing the extracted text in an eXtensible markup language ('XML') library file associated with an AAC compressed MPEG 4 file as discussed below with reference to FIG. 9.

As discussed above, storing (512) the extracted text (508) of the selected content (504) as metadata (862) associated with the media file (310 may be carried out by inserting the extracted text in the media file itself, such as by inserting the extracted text in an ID3 tag in an MPEG file. For further explanation, FIG. 8 sets forth a block diagram of an MPEG file (874) such as an .mp4 file having extracted text and images for display on the display screen of a portable media player in accordance with the present invention. The MPEG file of FIG. 8 includes an audio portion (882) of the media file. The audio portion of the MPEG file includes the binary audio data.

Figure 8:
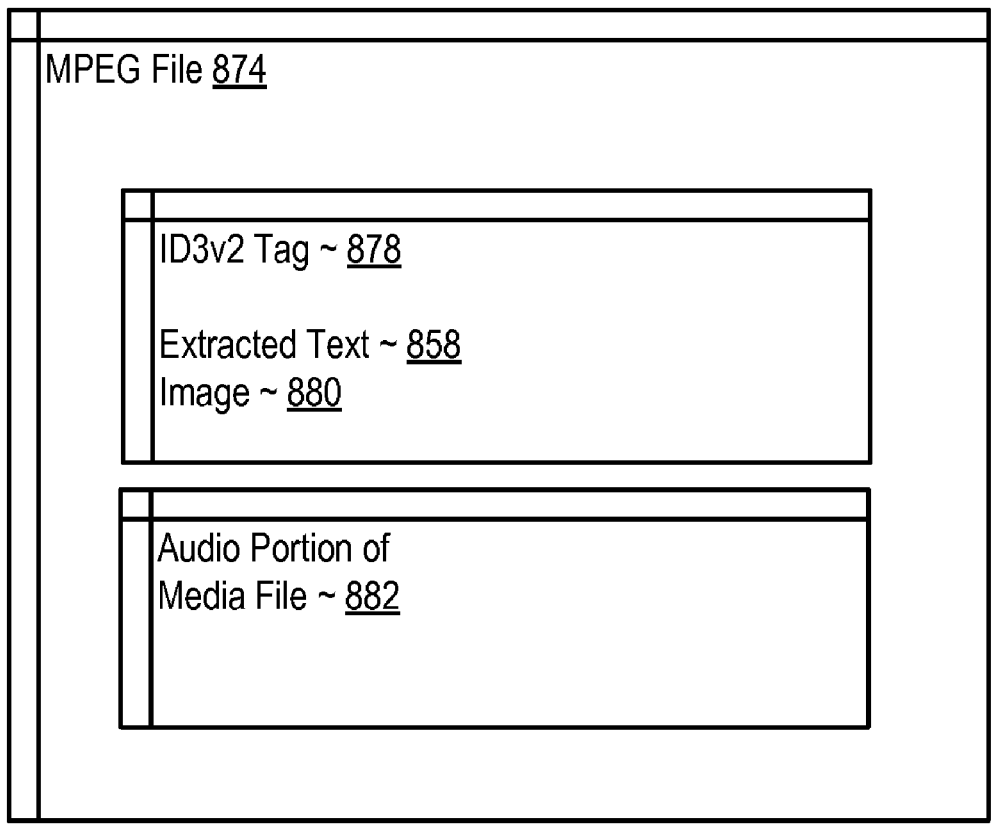
FIG. 8 sets forth a block diagram of an MPEG file such as an .mp4 file.

The MPEG file (874) of FIG. 8 has an ID3v2 tag (878) prepended to the audio portion (882) of the file that contains extracted text from content assigned to the channel and included in the MPEG media file (874) included in the playlist. The ID3v2 tag also includes image (880) such as an image extracted from the same content. An ID3v2 tag provides a container for metadata associated with the media file. An ID3v2 tag includes one or more games supporting the inclusion of text, images, files, and other information. ID3v2 tags are flexible and expandable because parsers that do not support specific functions of the an ID3v2 tag will ignore those functions. ID3v2 supports Unicode thereby providing the ability to include extracted text of many different languages. The maximum tag size of an ID3v2 tag is typically 256 megabytes and maximum frame size is typically 16 megabytes.

Figure 9:
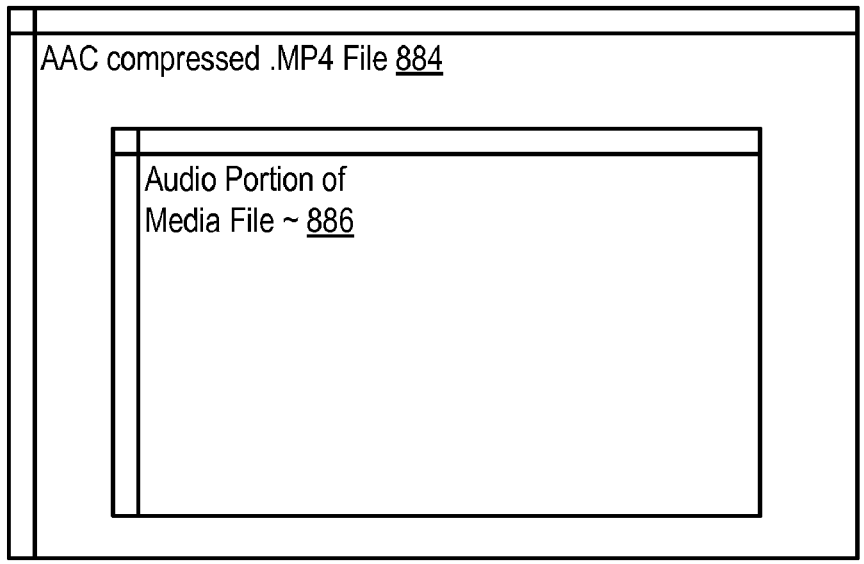
FIG. 9 sets forth a block diagram of an AAC compressed .mp4 file such as those supported by the iTunes portable media player application and played on an iPod portable media player.
Figure 9:
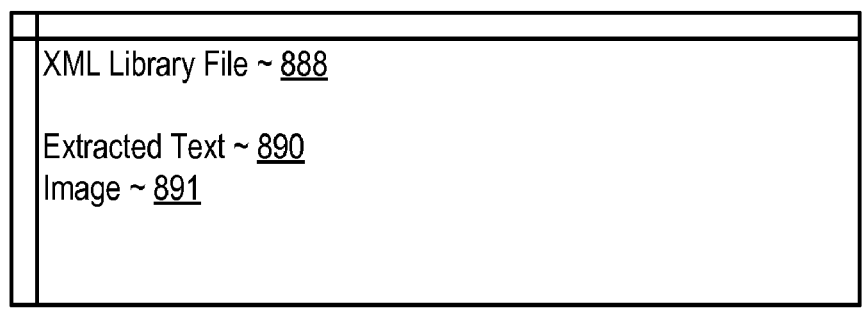

As discussed above, storing (512) the extracted text (858) of the selected content as metadata associated with the media file may also be carried out by storing the extracted text in a metadata file associated with the media file such as by storing the extracted text in an eXtenxible markup language ('XML') library file associated with an AAC compressed MPEG 4 file. For further explanation, therefore, FIG. 9 sets forth a block diagram of an AAC compressed .mp4 file (884) such as those supported by the iTunes portable media player application and played on an iPod portable media player having extracted text and images for display on the display screen of the portable media player in accordance with the present invention. In the example of FIG. 9, the AAC compressed .mp4 file has included in the file the binary audio portion (886) of the digital media file. The AAC compressed .mp4 file (884) of FIG. 9 also has an associated metadata file implemented as an eXtenxible markup language ('XML') library file (888) that includes the extracted text (890) or image (891) content. iTunes portable media player application includes a single iTunes library file that contains metadata describing the contents of the media files comprising the iTunes library. The iTunes library file is implemented as an XML file, the format of which is defined by a flexible Document Type Definition ('DTD').

As discussed above, rendering one or more of the plurality of media files may include rendering images extracted from the portion of aggregated content included in the playlist. For further explanation, FIG. 10 sets forth a flow chart illustrating an exemplary method for creating a plurality of media files including the portion of the aggregated content assigned to the channel that includes images extracted from the portion of aggregated content making up the playlist. The method of FIG. 10 includes selecting (502) content (504) for inclusion in each media file of the playlist. Selecting (502) content (504) for inclusion in each media file of the playlist may be carried out by identifying a single file of the portion of aggregated content assigned to the channel. Selecting (502) content (504) for inclusion in each media file of the playlist may also be carried out by identifying specific content in a document, file or data structure of the portion of aggregated content assigned to the playlist.

Figure 10:
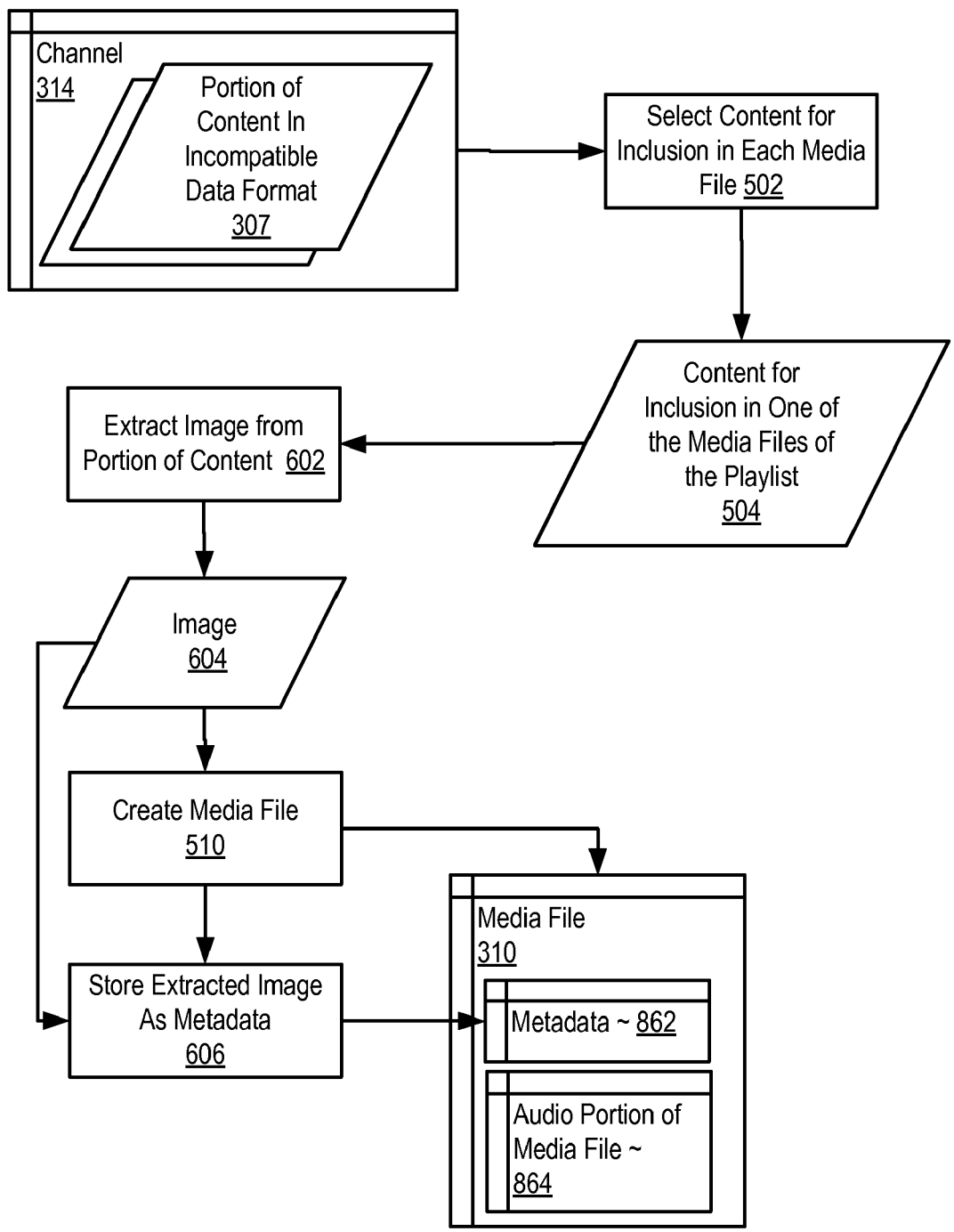
FIG. 10 sets forth a flow chart illustrating an exemplary method for creating a plurality of media files including the portion of the aggregated content assigned to the channel that includes images extracted from the portion of aggregated content making up the playlist FIG. 11 sets forth a flow chart illustrating an exemplary method for creating a plurality of media files including the portion of the aggregated content assigned to the channel.

The method of FIG. 10 also includes extracting (602) an image (604) from the content (504) for inclusion in each media file of the playlist. Extracting (602) an image (604) from the content (504) for inclusion in each media file of the playlist may include extracting an image file from the content itself. Extracting (602) an image (604) from the content (504) for inclusion in each media file of the playlist may also include identifying a reference to an image file such as a URL pointing to an image file, such as in a web page, and retrieving the image file.

The method of FIG. 10 also includes creating (510) the media file (310). Examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

The method of FIG. 10 also includes storing (606) the extracted image (604) of the selected content (504) as metadata (862) associated with the media file (310). Storing (606) the extracted image (604) of the selected content (504) as metadata (862) associated with the media file (310) may be carried out by inserting the extracted image in the media file itself, such as by inserting the extracted image in an ID3 tag in an MPEG file as discussed above with reference to FIG. 8. Storing (606) the extracted text (604) of the selected content (504) as metadata (862) associated with the media file (310) also may be carried out by storing the extracted image in a metadata file associated with the media file such as by storing a reference to the extracting image in an eXtenxible markup language ('XML') library file associated with an AAC compressed MPEG 4 file as discussed above with reference to FIG. 9.

As discussed above, content assigned to the channel and included in the playlist may also be rendered as a speech presentation recorded in the audio portion of a media file included in the playlist. For further explanation, FIG. 11 sets forth a flow chart illustrating an exemplary method for creating a plurality of media files including the portion of the aggregated content assigned to the channel. The method of FIG. 11 also includes selecting (702) content (704) for inclusion in each media file (310) of the playlist.

Figure 11:
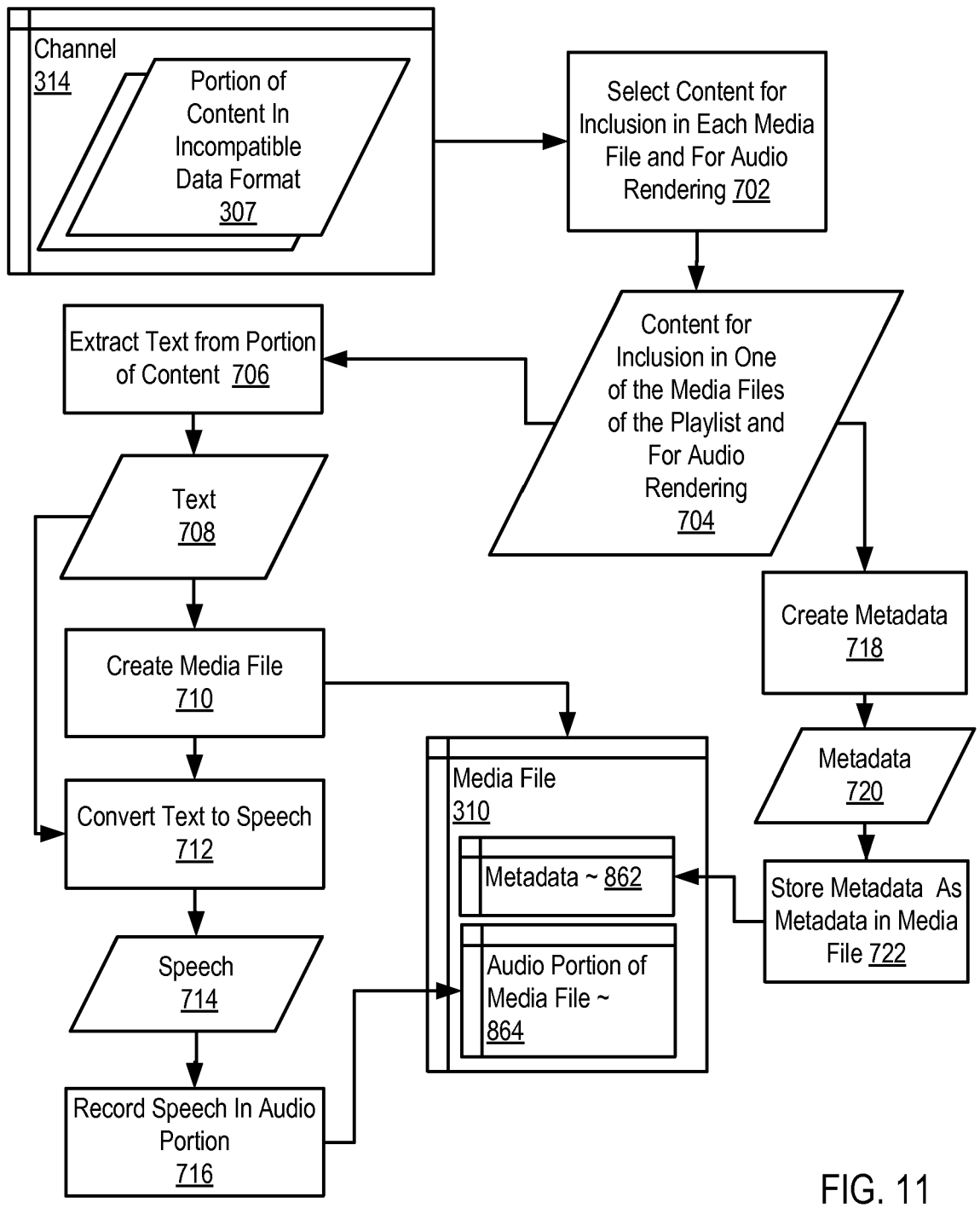

The method of FIG. 11 includes selecting (702) content (704) for inclusion in each media file of the playlist. Selecting (702) content (704) for inclusion in each media file of the playlist may be carried out by identifying a single file of the portion of aggregated content assigned to the channel. Selecting (702) content (704) for inclusion in each media file of the playlist may also be carried out by identifying specific content in a document, file or data structure of the portion of aggregated content assigned to the playlist.

The method of FIG. 11 also includes extracting (706) text (708) from the content (704) for inclusion in each media file (310) of the playlist and for audio rendering by the portable media player. As discussed above, extracting text from the content for inclusion in each media file of the playlist may be carried out in a number of ways depending upon the data format of the content from which the text is extracted as discussed above with reference to FIG. 11 and all such ways of extracting text are also applicable to the method of FIG. 11.

The method of FIG. 11 also includes creating (710) the media file (310). Examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

The method of FIG. 11 also includes converting (712) the extracted text (708) to speech (714) and recording (716) the speech (714) in the audio portion (864) of the media file (310). Converting the text to speech and recording the speech in the audio portion of the media file may be carried out by processing the extracted text using a text-to-speech engine in order to produce a speech presentation of the extracted email text and then recording the speech produced by the text-speech-engine in the audio portion of a media file.

Examples of speech engines capable of converting extracted text to speech for recording in the audio portion of a media filed include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they have the highest potential for sounding like natural speech, but concatenative systems require large amounts of database storage for the voice database.

The method of FIG. 11 also includes creating (718) metadata (720) describing the content (704) selected for inclusion in each media file of the playlist. Creating (718) metadata (720) describing the content (704) selected for inclusion in each media file of the playlist may be carried out by extracting metadata already provided in the content selected for inclusion in the playlist, extracting text identified as a title or subheading in the content selected for inclusion in the playlist or any other for creating metadata describing the content that will occur to those of skill in the art.

The method of FIG. 11 also includes storing (722) the created metadata (720) as metadata (862) associated with the media file (310). Storing (722) the created metadata (720) as metadata (862) associated with the media file (310) may be carried out by inserting the metadata in the media file itself, such as by inserting the extracted image in an ID3 tag in an MPEG file as discussed above with reference to FIG. 8. Storing (722) the created metadata (720) as metadata (862) associated with the media file (310) also may be carried out by storing the metadata in a metadata file associated with the media file such as by storing the metadata in an eXtenxible markup language ('XML') library file associated with an AAC compressed MPEG 4 file as discussed above with reference to FIG. 9.

Exemplary embodiments of the present invention are described largely in the context of a fully functional computer system for providing disparate content as a playlist of media files for rendering on a portable media player. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for providing disparate content as a playlist of media files for rendering on a portable media player, the method comprising:

aggregating content of disparate data formats from disparate data sources, wherein the aggregated content is in a data format incompatible with the portable media player;

assigning a portion of the aggregated content to a channel, wherein assigning a portion of the aggregated content to a channel further comprises:

identifying attributes of the aggregated content;

characterizing the attributes of the aggregated content; and assigning a portion of the aggregated content to a predetermined channel in dependence upon characterized attributes and channel assignment rules;
creating a plurality of media files including the portion of the aggregated content assigned to the channel, the media files being in a data format compatible with the portable media player, wherein creating a plurality of media flies including the portion of the aggregated content assigned to the channel further comprises:
creating metadata describing the content selected for inclusion in each media file of the playlist; and
storing the created metadata as metadata associated with the media file;
storing the plurality of media files as a playlist;
storing the playlist on the portable media player; and
rendering the plurality of media files of the playlist on the portable media player.

2. The method of claim 1 wherein creating a plurality of media files including the portion of the aggregated content assigned to the channel further comprises:
selecting content for inclusion in each media file of the playlist;
extracting text from the content for inclusion in each media file of the playlist;
creating the media file; and
storing the extracted text of the selected content as metadata associated with the media file.

3. The method of claim 1 wherein creating a plurality of media files including the portion of the aggregated content assigned to the channel further comprises:
selecting content for inclusion in each media file of the playlist;
extracting an image from the content for inclusion in each media file of he playlist;
creating the media file; and
storing the extracted image of the selected content as metadata associated with the media file.

4. The method of claim 1 wherein creating a plurality of media files including the portion of the aggregated content assigned to the channel further comprises:
selecting content for inclusion in each media file of the playlist;
extracting text from the content for inclusion in each media file of the playlist and for audio rendering by the portable media player;
creating the media file;
converting the extracted text to speech; and
recording the speech in the audio portion of the media file.

5. A system for providing disparate content as a playlist of media files for rendering on a portable media player, the system comprising:
a computer processor;
a computer memory operatively coupled to the computer processor;
the computer memory having disposed within it computer program instructions that, when executed, carry out the steps of:
aggregating content of disparate data formats from disparate data sources, wherein the aggregated content is in a data format incompatible with the portable media player;
assigning a portion of the aggregated content to a channel, wherein assigning a portion of the aggregated content to a channel further comprises:
identifying attributes of the aggregated content;
characterizing the attributes of the aggregated content; and
assigning a portion of the aggregated content to a predetermined channel in dependence upon characterized attributes and channel assignment rules;
creating a plurality of media files including the portion of the aggregated content assigned to the channel, the media files being in a data format compatible with the portable media player, wherein creating a plurality of media files including the portion of the aggregated content assigned to the channel further comprises:
creating metadata describing the content selected for inclusion in each media file of the playlist; and
storing the created metadata as metadata associated with the media file;
storing the plurality of media files as a playlist;
storing the playlist on the portable media player; and
rendering the plurality of media files of the playlist on the portable media player.

6. The system of claim 5 wherein computer program instructions capable of creating a plurality of media files including the portion of the aggregated content assigned to the channel further comprise computer program instructions that, when executed, carry out the steps of
selecting content for inclusion in each media file of the playlist;
extracting text from the content for inclusion in each media file of the playlist;
creating the media file; and
storing the extracted text of the selected content as metadata associated with the media file.

7. The system of claim 5 wherein computer program instructions capable of creating a plurality of media files including the portion of the aggregated content assigned to the channel further comprise computer program instructions that, when executed, carry out the steps of
selecting content for inclusion in each media file of the playlist;
extracting an image from the content for inclusion in each media file of the playlist;
creating the media file; and
storing the extracted image of the selected content as metadata associated with the media file.

8. The system of claim 5 wherein computer program instructions capable of creating a plurality of media files including the portion of the aggregated content assigned to the channel further comprise computer program instructions that, when executed, carry out the steps of:
selecting content for inclusion in each media file of the playlist;
extracting text from the content for inclusion in each media file of the playlist and for audio rendering by the portable media player;
creating the media file;
converting the extracted text to speech; and
recording the speech in the audio portion of the media file.

9. A computer program product for providing disparate content as a playlist of media files for rendering on a portable media player, the computer program product embodied on a recordable media for machine-readable information, the computer program product comprising:
computer program instructions for aggregating content of disparate data formats from disparate data sources, wherein the aggregated content is in a data format incompatible with the portable media player;
computer program instructions for assigning a portion of the aggregated content to a channel, wherein assigning a portion of the aggregated content to a channel further comprises:

computer program instructions for identifying attributes of the aggregated content;

computer program instructions for characterizing the attributes of the aggregated content; and computer program instructions for assigning a portion of the aggregated content to a predetermined channel in dependence upon characterized attributes and channel assignment rules;

computer program instructions for creating a plurality of media files including the portion of the aggregated content assigned to the channel, the media files being in a data format compatible with the portable media player, wherein computer program instructions for creating a plurality of media files including the portion of the aggregated content assigned to the channel further comprises:

computer program instructions for creating metadata describing the content selected for inclusion in each media file of the playlist; and computer program instructions for storing the created metadata as metadata associated with the media file;

computer program instructions for storing the plurality of media files as a playlist;

computer program instructions for storing the playlist on the portable media player; and computer program instructions for rendering the plurality of media files of the playlist on the portable media player.

10. The computer program product of claim 9 wherein creating a plurality of media files including the portion of the aggregated content assigned to the channel further comprises:

computer program instructions for selecting content for inclusion in each media file of the playlist;

computer program instructions for extracting text from the content for inclusion in each media file of the playlist and for audio rendering by the portable media player;

computer program instructions for creating the media file;

computer program instructions for converting the extracted text to speech; and computer program instructions for recording the speech in the audio portion of the media file.

computer program instructions for creating metadata describing the content selected for inclusion in each media file of the playlist; and computer program instructions for storing the created metadata as metadata associated with the media file.

\* \* \* \* \*